US009447842B2

(12) United States Patent
Wesling et al.

(10) Patent No.: US 9,447,842 B2
(45) Date of Patent: Sep. 20, 2016

(54) BICYCLE WHEEL AND COUNTERWEIGHT (75) Inventors: Kevin J. Wesling, Lombard, IL (US);
Josh Poertner, Indianapolis, IN (US);
Nathan Luman, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 399 days.

(21) Appl. No.: 13/559,878

(22) Filed: Jul. 27, 2012

(65) Prior Publication Data

US 2014/0028079 A1    Jan. 30, 2014

(51) Int. Cl.
*F16F 15/34* (2006.01)
*B60B 21/12* (2006.01)

(52) U.S. Cl.
CPC ............. *F16F 15/345* (2013.01); *B60B 21/12* (2013.01); *B60B 2900/313* (2013.01)

(58) Field of Classification Search
CPC ........... B60B 1/00; F16F 15/34; F16F 15/32; F16F 15/324; B29C 45/14

USPC .......................... 301/5.21, 22, 5.22; 280/261
See application file for complete search history.

(56) References Cited

U.S. PATENT DOCUMENTS

| 1,667,344 | A | * | 4/1928 | Couture | 301/5.21 |
|---|---|---|---|---|---|
| RE18,578 | E | * | 8/1932 | Couture | 301/5.21 |
| 1,889,577 | A | * | 11/1932 | Tibbetts | 301/5.21 |
| 2,272,801 | A | * | 2/1942 | Hawrylasz | 280/212 |
| 4,636,344 | A | * | 1/1987 | McDougall | 264/102 |
| 7,192,096 | B2 | * | 3/2007 | Fogal et al. | 301/5.22 |
| 7,425,041 | B2 | * | 9/2008 | Passarotto et al. | 301/55 |
| 2009/0127919 | A1 | * | 5/2009 | Burnett | 301/5.21 |
| 2010/0116396 | A1 | * | 5/2010 | Douglas | 152/340.1 |
| 2010/0219606 | A1 | * | 9/2010 | Orozco | 280/261 |
| 2011/0109150 | A1 | * | 5/2011 | McCulloch et al. | 301/5.21 |

* cited by examiner

*Primary Examiner* — Jason Bellinger
(74) *Attorney, Agent, or Firm* — Milan Milosevic; Lisa Serdynski (57) ABSTRACT

A bicycle wheel including a rim with one or more counterweight assemblies. Each of the one or more counterweight assemblies includes a receiver attached to the rim and a counterweight that is attached to the receiver.

22 Claims, 10 Drawing Sheets

BICYCLE WHEEL AND COUNTERWEIGHT

BACKGROUND OF THE INVENTION

The invention relates to bicycle wheels, and more particularly, to the counterbalancing of the bicycle wheel, which has a bicycle rim and tire.

Bicycle wheels and rims have evolved greatly in recent years. New wheel materials and construction have permitted bicycle wheels to become significantly lighter while also being stronger—research has resulted in the development of non-traditional shapes and sizes of wheel rims. In particular, deep section wheel rims have presented significant aerodynamic benefits, while FRP (e.g., carbon fiber) rim construction has yielded ever lighter wheels.

One of the effects of the use of deep section rims is the need to use a long valve stem in order to fill a tire inner tube mounted to the wheel with air. The long valve stem can unbalance the wheel. However, because of the light weight of modern wheels, the effects of even a typical valve stem can be felt under certain circumstances.

BRIEF SUMMARY OF THE INVENTION

In light of the present need for an improved bicycle wheel, and in particular, a wheel that is provided with the ability to balance the distribution of rotating mass thereof, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections, but it should be understood that minor variations of these concepts are contemplated by the invention.

One aspect of the invention provides a bicycle rim assembly including a rim and one or more counterweight assemblies. Each of the one or more counterweight assemblies includes a receiver attached to the rim and a counterweight attached to the receiver.

These and other features and advantages of the present invention will be more fully understood from the following description of one or more embodiments of the invention, taken together with the accompanying drawings.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "upper" and "lower," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1A:
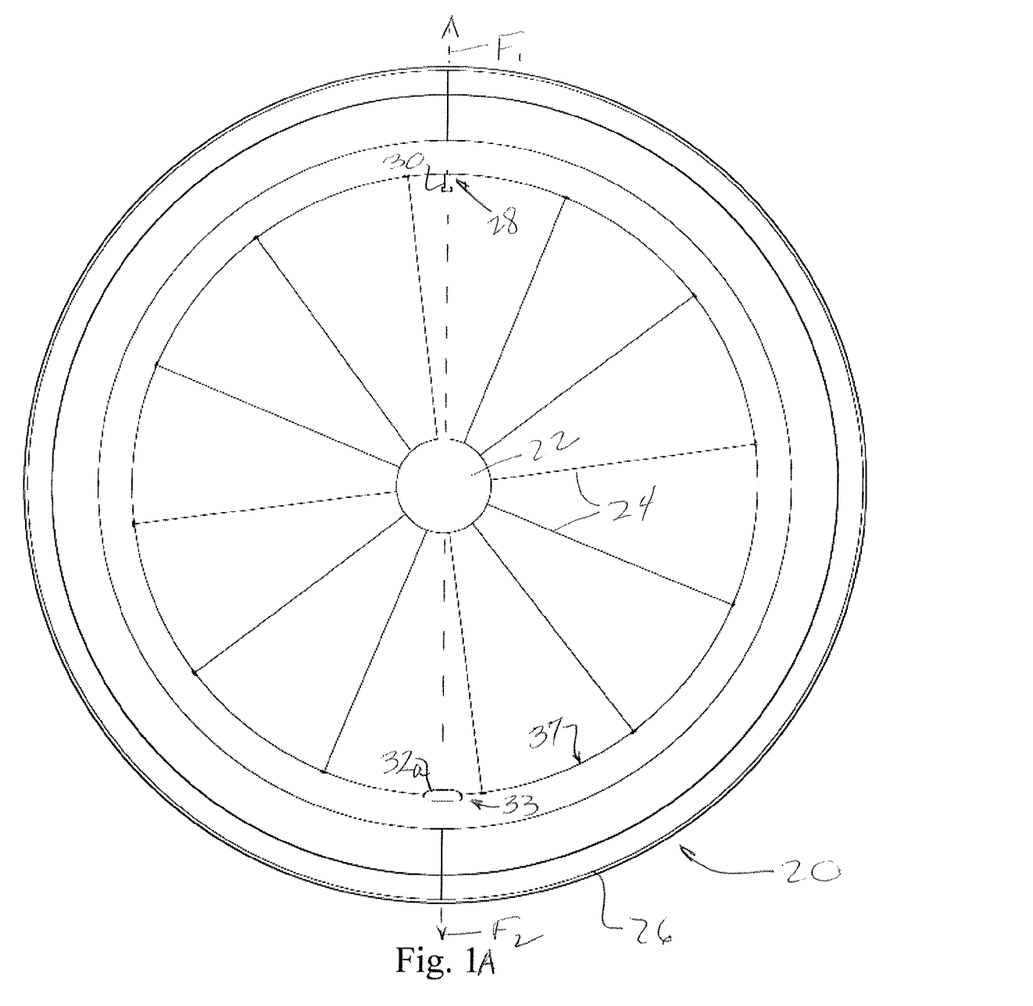
FIGS. 1A and 1B are two embodiments of bicycle wheels in a side view according to two embodiments of the invention.
Figure 1B:
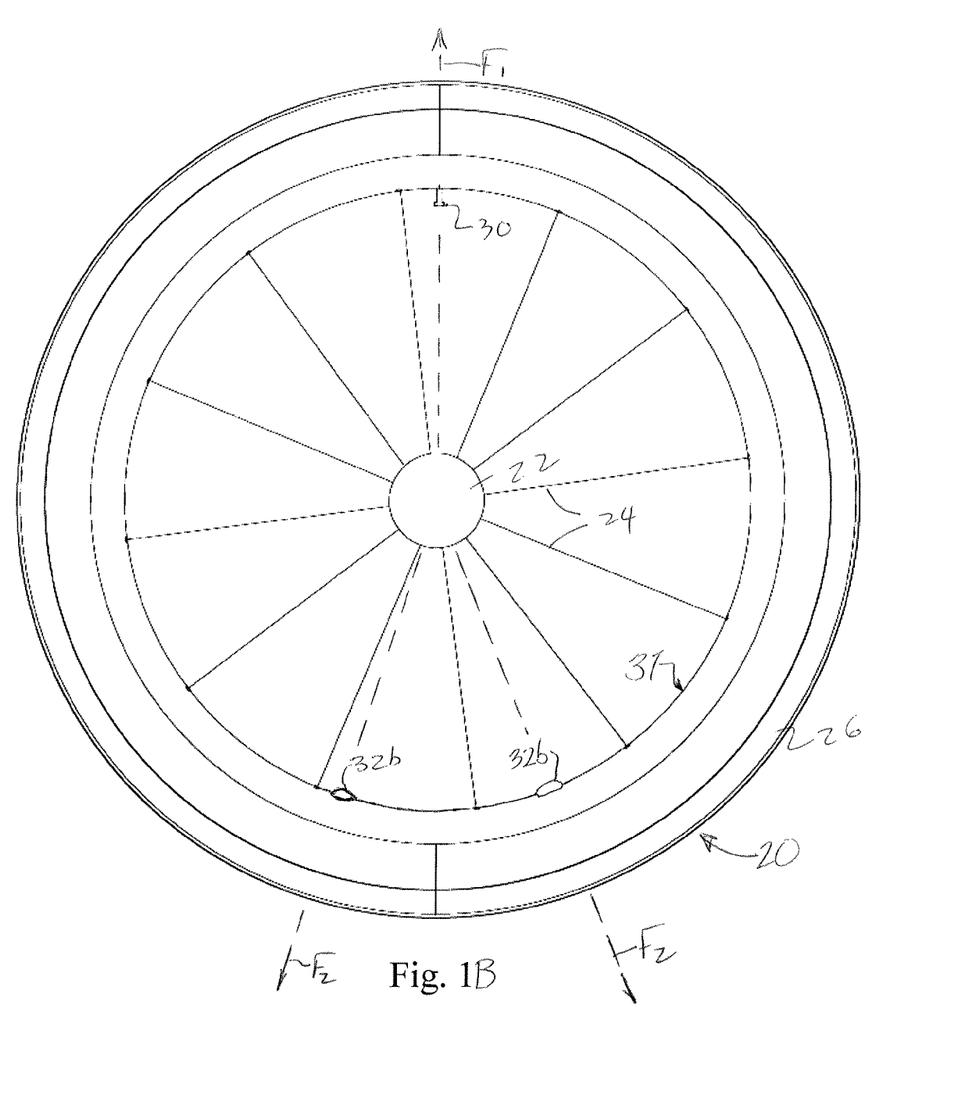

FIGS. 1A and 1B each show a wheel 20 for a bicycle (not shown) or the like. The wheel 20 includes a hub 22, positioned and suspended centrally by a plurality of spokes 24 in a rim 26 as is well known. At a radially inward point on the rim 26 there is an opening 28 formed through the rim through which a valve stem 30 typically extends. Embodiments of the invention contemplate FRP rims, metal rims, and hybrid rims comprising FRP and metal.

The invention provides a counterweight assembly 32 (32a in FIG. 1A) comprising a counterweight 33, which is positioned across from the opening 28 for counterbalancing the weight of the stem 30 in a bicycle wheel 20. In the embodiment of FIG. 1A, the force created by the weight of the stem 30 ($F_1$) is counterbalanced by the force created by the weight of the counterweight assembly 32a ($F_2$).

While a single counterweight assembly 32 is shown positioned at or about 180 degrees across from the opening 28 and stem 30 in FIG. 1A, it will be understood that more than one counterweight assembly may be positioned so as to counter the weight of the stem and provide a balanced wheel 20. In such an embodiment, shown in FIG. 1B, the counterweight assemblies 32b may be of a lesser individual weight than the assembly 32a shown in FIG. 1, but totaling an amount of weight sufficient to provide the necessary weight to balance the wheel 20. In the embodiment of FIG. 1B, the force created by the weight of the stem 30 ($F_1$) is counterbalanced by the forces created by the weight of the two counterweight assemblies 32b ($F_2+F_2$). A single counterweight assembly 32 may be preferred, however, such that a minimum number of holes are formed through the rim 26.

Figure 2:
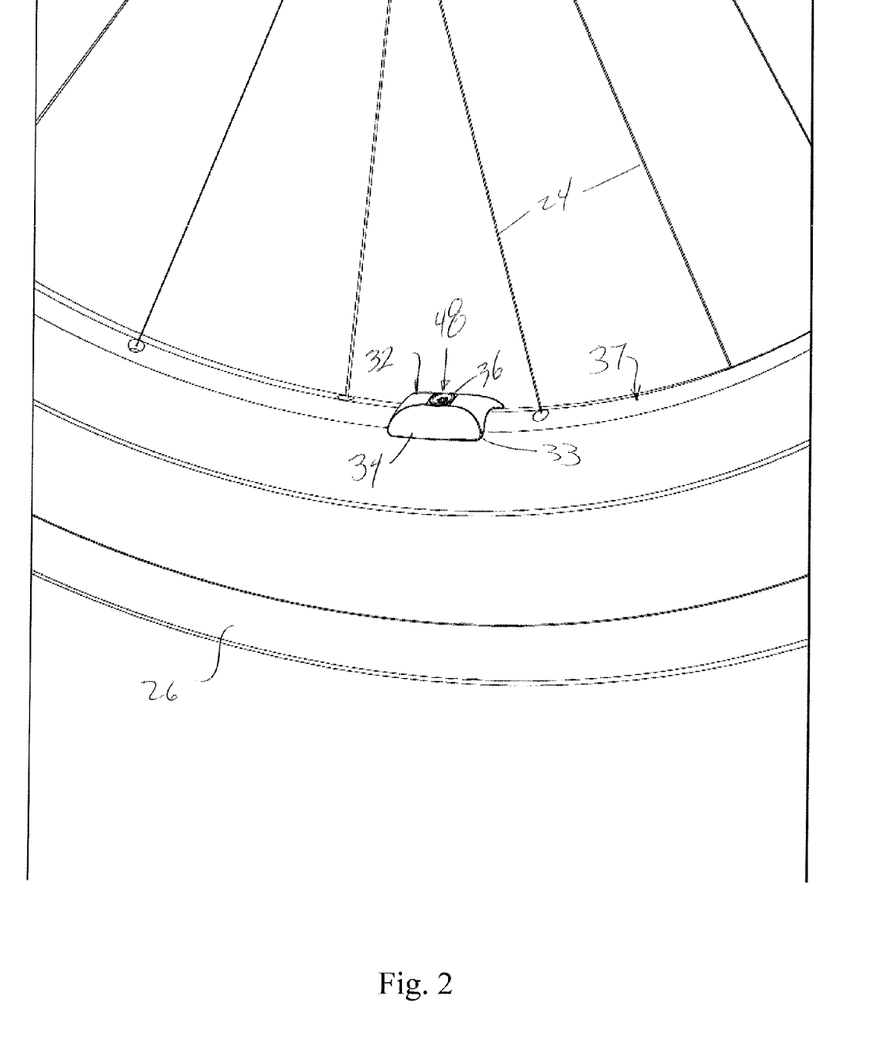
FIG. 2 is a bicycle wheel with a counterweight in a close up view.

FIG. 2 shows a counterweight assembly 32 positioned on a rim 26. The counterweight assembly 32 includes a counterweight 33 comprised of a weight 34 and a mounting element or fastener 36. The weight 34 may be any suitable amount of weight necessary to balance the rim 26. Some examples of suitable amounts of weight are 6, 9 and 12 grams. The weight 34 may be any suitable material: metal, plastic, rubber, composite, wood, and so on.

Figure 3:
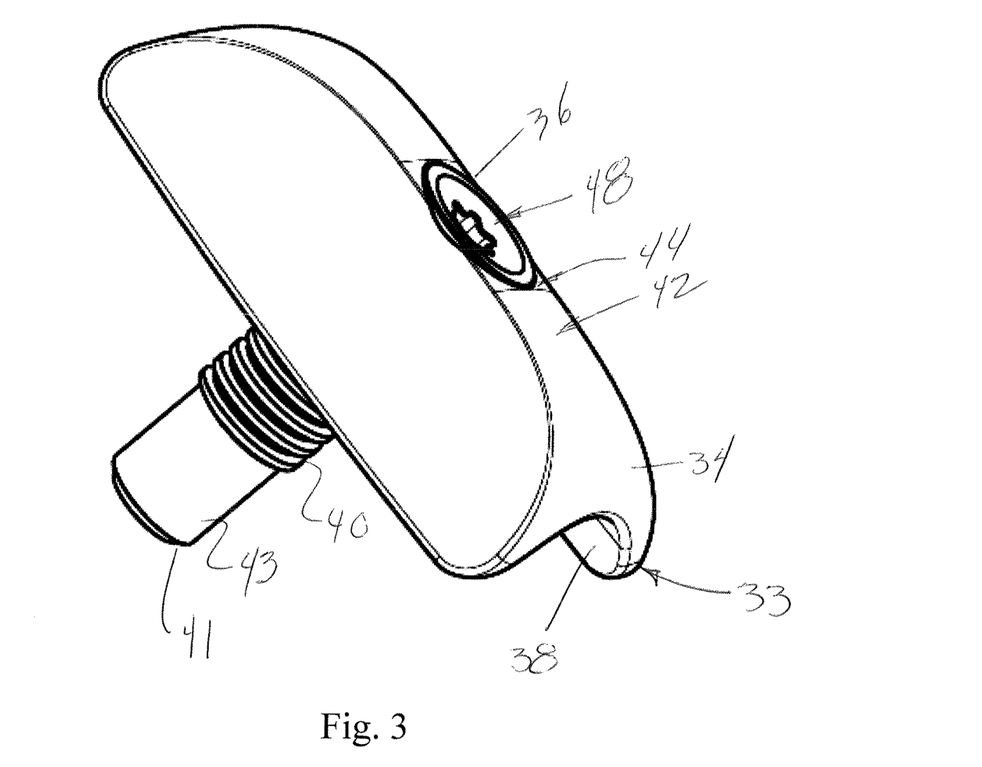
FIG. 3 is a counterweight including a weight and mounting element in a perspective view according to one embodiment of the invention.

FIG. 3 shows an assembled weight 34 and mounting element 36 forming one embodiment of counterweight 33. Overall, the weight 34 may have a shape resembling a saddle, with an outer surface 38 that may be shaped to be received on the radially inner part 37 (FIG. 1) of a rim 26. In many instances, the outer surface 38 will be concave so as to conform and/or match to the shape of the radially inner part 37 of the rim 26 to assist in holding it in place.

The weight 34 may be any suitable shape to provide the necessary mass for the counterbalancing effect; however, the inner surface 42 of the weight may be a smooth, low-profile, curved shape to provide an overall aerodynamic effect and thus, not significantly increase drag of the rotating wheel 20.

A fastener hole 44 is provided through the weight 34 to receive the mounting element 36 for releasably securing the weight 34 to the rim 26 (FIG. 1). The mounting element 36 may be a fastener or bolt with external threads 40. In one embodiment, the mounting element 36 has external threads 40 that extend only part way to the end 41 of the mounting element and thus define a non-threaded shaft or portion 43 of the mounting element. It will be understood that the weight 34 may be releasably attached to the rim or permanently attached by welding, adhesives or any other suitable attachment means or mechanism. The mounting element 36 may have a tool engagement feature 48, for receiving a screw driver blade, or a Phillips screw driver bit, or a star-headed or hex tool, for example. The tool engagement feature 48 permits tightening and loosening of the mounting element 36 and permits easy replacement of the counterweight 33.

Figure 4:
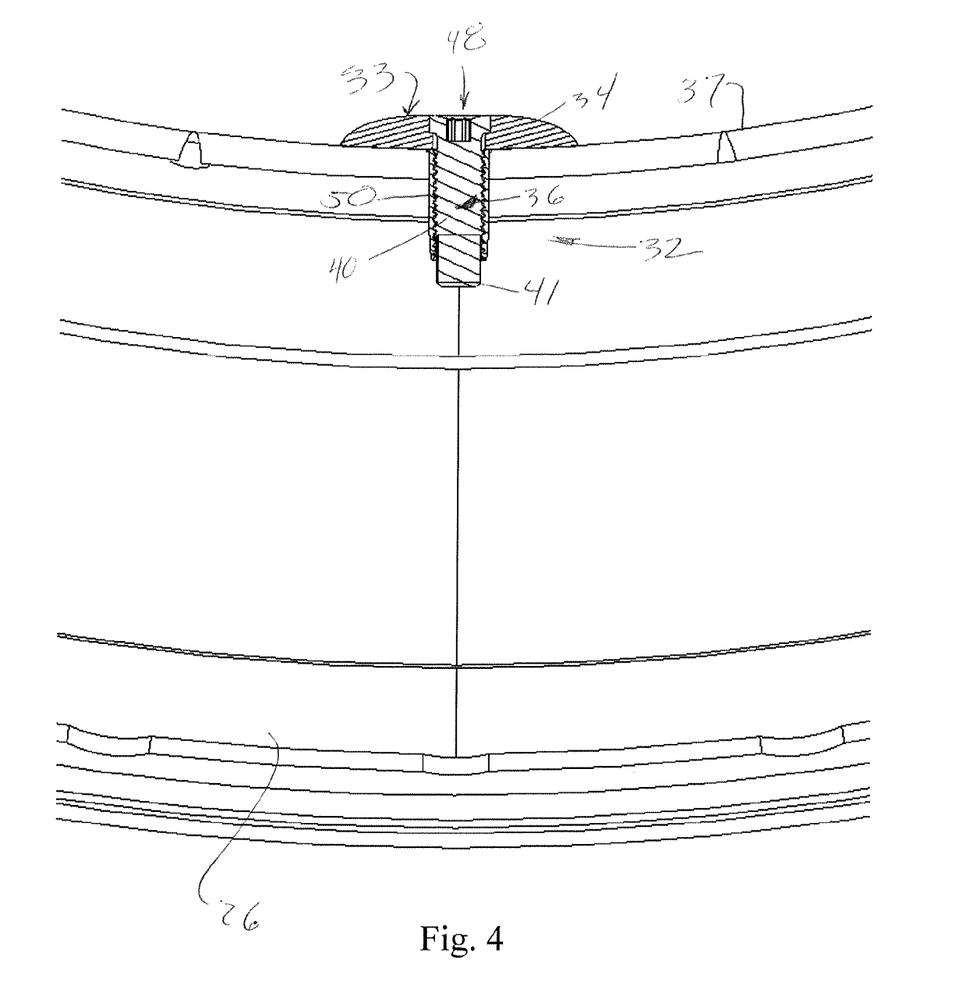
FIG. 4 is a cross sectional view of a counterweight assembly attached to a rim taken through the plane of the rim.
Figure 5:
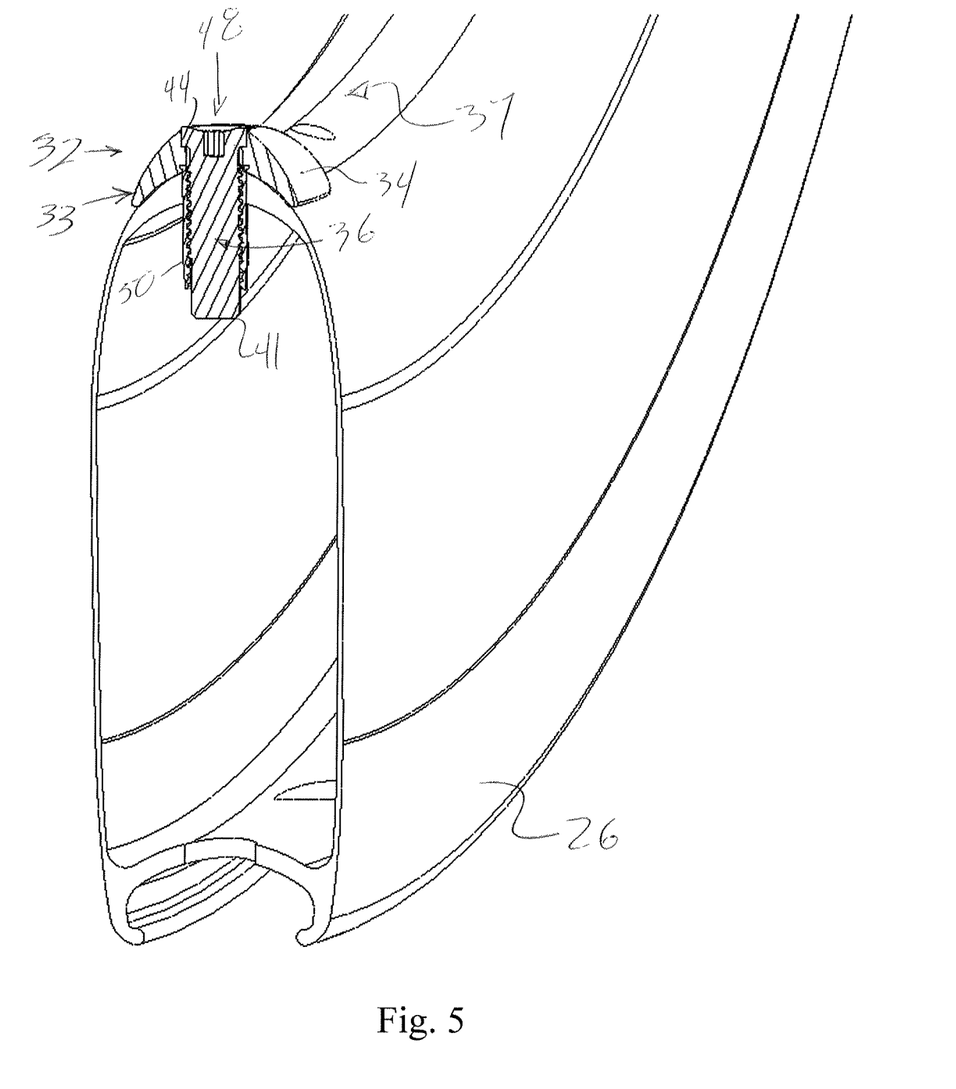
FIG. 5 is a cross sectional view of a counterweight assembly attached to a rim taken across the plane of the rim.

FIGS. 4 and 5 show the counterweight assembly 32 in position on a rim 26 for a bicycle. The counterweight assembly 32 includes a counterweight 33 and a receiver 50 in the form of a sleeve or a rivet nut, such as one offered by Cardinal Components Inc., in an M5×0.8 size is disposed in the rim 26, for example. The counterweight 33 is attached to the rim by engaging with the receiver 50. Rivet nuts are well-known fastener parts. It will be understood that any suitable size and configuration of rivet nut 50 is contemplated by the invention. Also, other fasteners, such as Dzuz fasteners, bayonet style fittings, and other suitable means of attaching a counterweight are contemplated by the invention.

Figure 6:
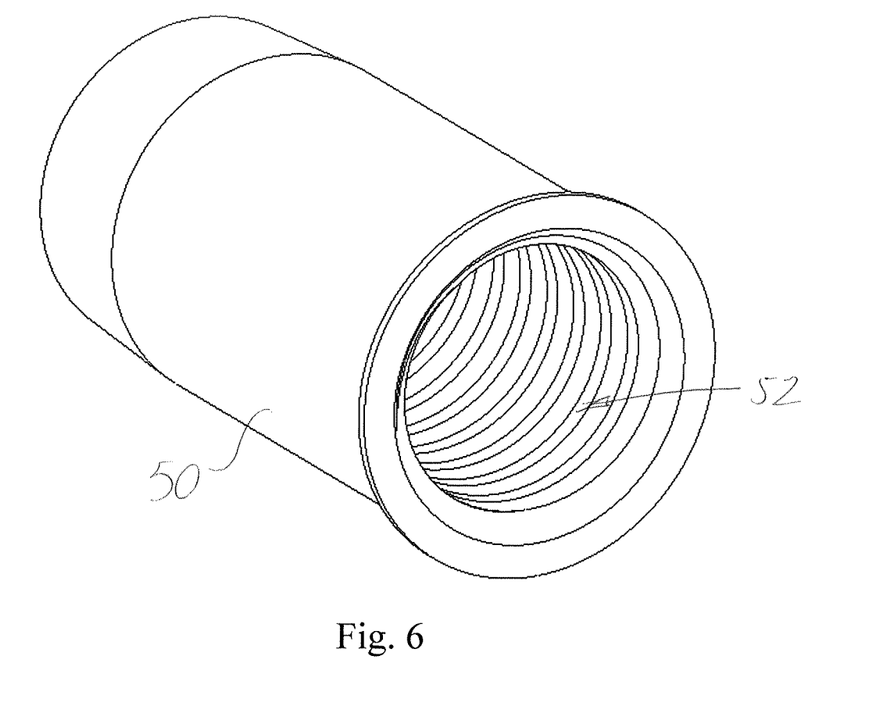
FIG. 6 is a rivet nut part of the counterweight assembly in a perspective view.

The receiver 50 (FIG. 6) has internal threads 52 that engage the threads 40 of mounting element 36 part of the counterweight 33. The mounting element 36 retains the weight 34 on the rim 26. Use of a "thin-head" rivet nut for the receiver 50 permits the weight 34 to sit close to the rim 26.

An installation procedure of the counterweight assembly 32 will now be described. An initial step is to secure the receiver 50 to an opening 46 formed through the rim 26 that is sized to receive the receiver. The receiver 50 may be installed with a traditional technique, using a rivet nut tool, as is well known. This step may be performed by the manufacturer of the rim.

Once the receiver 50 is installed in the rim 26, the mounting element 36 is inserted through the fastener hole 44 in the weight 34 to assemble the counterweight 33, and then the counterweight is installed to the receiver 50 by screwing the assembled counterweight into the receiver with a screwdriver or any suitable tool. In order to change the amount of weight of the counterweight 33, one has only to remove the mounting element 36 securing the weight 34 to the rim 26, and simply exchange the existing weight with another of a different value and reattaching the assembled replacement counterweight to the receiver 50. This may become necessary, for example, if valve stems 30 of a different length (and therefore weight) are used on the wheel 20.

Figures 7A, 7B:
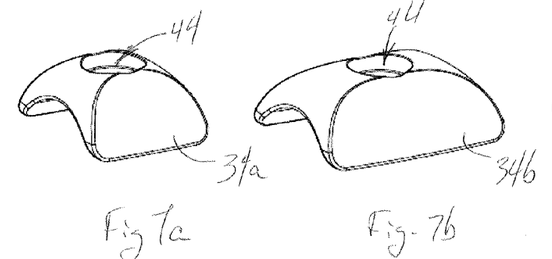
FIGS. 7a-c set out different sized weights in perspective views.
Figure 7C:
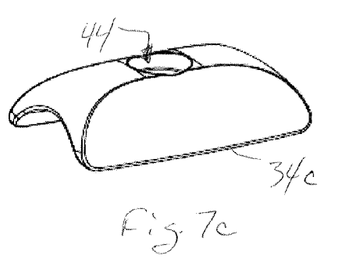

FIGS. 7*a-c* show a number of different sized and shaped weights 34*a*, 34*b*, and 34*c*. The amount of weight of each of the weights 34*a*, 34*b*, and 34*c* are different because they have different lengths extending along the circumferential direction of the rim 26. Other means of providing different weights is contemplated by the invention, such as providing the weights in different materials or densities, for example, and in kit form with a variety of weights and/or mounting elements so that the wheel can be balanced after manufacturing and/or after a tire and inner tube is installed on the wheel, by retail shop personnel, or by the owner.

Figure 8:
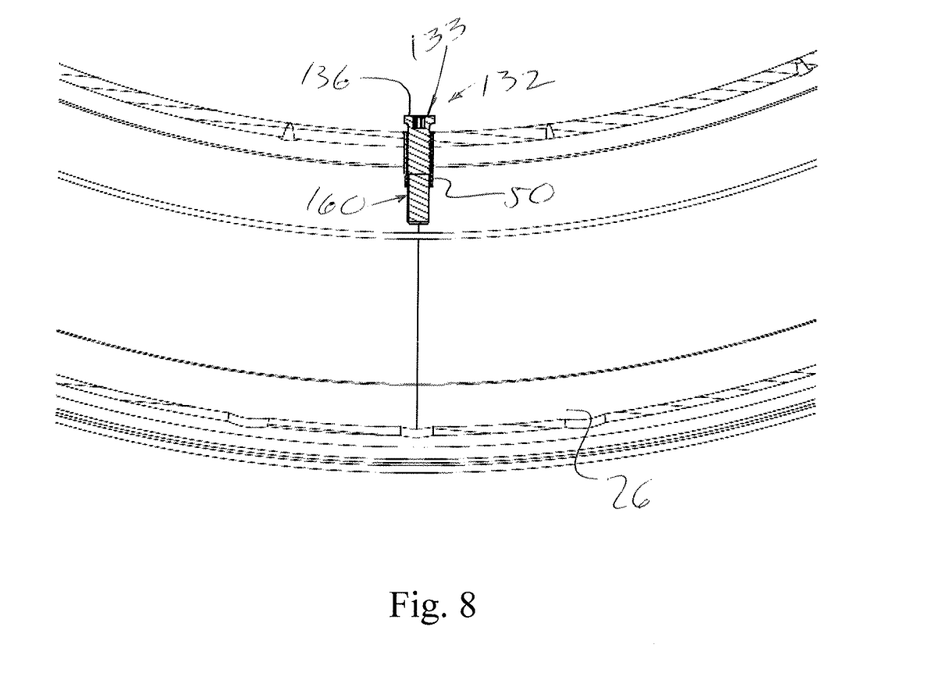
FIG. 8 is a cross sectional view of a counterweight assembly attached to a rim taken through the plane of the rim according to another embodiment of the invention.

Another embodiment of the invention is illustrated in FIGS. 8 and 9. In this embodiment, a counterweight assembly 132 is shown in position on a wheel rim 26. The counterweight assembly 132 includes two parts: a receiver 50, as in the above detailed embodiment, and a counterweight 133 comprised of a mounting element 136 removably threadably inserted into the receiver. A difference between the counterweight assembly 132 of the instant embodiment and the embodiment described above is that there is no additional weight component in this embodiment. The necessary amount of weight to provide the counterbalancing effect of the counterweight assembly 132 is wholly provided by the combination of the rivet nut receiver 50 and the mounting element 136.

Figures 9A, 9B, 9C:
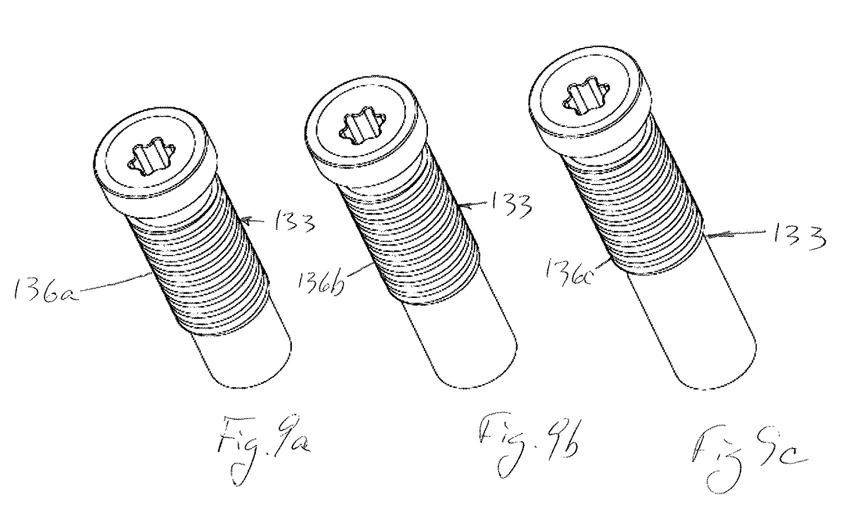
FIGS. 9a-c set out different length counterweights in perspective views.

The mounting element 136 may be a modified version of the mounting element 36 of the above embodiment. Specifically, the mounting element 136 may have an extended body 160 that has an extent fashioned to supply the necessary weight to provide the correct amount of counterbalance effect. In other words, the mounting element 136 (in combination with the weight of the rivet nut 50) supplies the necessary amount of weight to counter the effect of the valve stem and thus balance the wheel. Therefore, the mounting element 136 can be provided in a varied number of sizes/shapes (as in a kit form, for example) in order to provide the appropriate amount of weight. The mounting element 136 attaches in the same manner as above to the rivet nut 50. FIGS. 9*a-c* show examples of alternative mounting elements 136*a*, 136*b*, and 136*c* of different shapes and sizes.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A balanced wheel for a bicycle, comprising:
   a rim;
   a hub;
   a plurality of spokes connecting the rim to the hub;
   a valve stem positioned through the rim; and
   a singular counterweight assembly attached to the rim and disposed symmetrically opposite the valve stem to counterbalance the weight of the valve stem, the counterweight assembly including:
   a receiver attached to the rim; and
   a counterweight attached to the receiver;
   wherein the singular counterweight assembly extends a distance along a circumference of the rim, and the counterweight has a circumferential length extending the distance along the circumference of the rim, the circumferential length correlating to a weight configured to counterbalance the valve stem.

2. The bicycle rim assembly of claim 1, wherein the receiver is a sleeve.

3. The bicycle rim assembly of claim 2, wherein the receiver is a rivet nut fixedly attached to the rim.

4. The bicycle rim assembly of claim 1, wherein the counterweight includes a mounting element.

5. The bicycle rim assembly of claim 4, wherein the mounting element is a fastener.

6. The bicycle rim assembly of claim 5, wherein the fastener is a bolt.

7. The bicycle rim assembly of claim 6, wherein the bolt includes a shaft and an external thread is formed along a portion of the shaft.

8. The bicycle rim assembly of claim 7, wherein the external thread of the bolt engages an internal thread of the receiver.

9. The bicycle rim assembly of claim 4, wherein the counterweight includes a replaceable weight.

10. The bicycle rim assembly of claim 9, wherein the weight includes a surface that is shaped to be received on the rim.

11. The bicycle rim assembly of claim 9, wherein the weight includes a radially outer surface that is shaped to be received on a radially inner surface of the rim.

12. The bicycle rim assembly of claim 11, wherein the radially outer surface of the weight is concave.

13. The bicycle rim assembly of claim 9, wherein the weight includes a fastener hole that receives the mounting element.

14. The bicycle rim assembly of claim 9, wherein the weight is formed of at least one of metal, plastic, rubber, fiber reinforced plastic, and wood.

15. The bicycle rim assembly of claim 1, wherein the rim includes a single counterweight.

16. The bicycle rim assembly of claim 1, wherein the rim includes multiple counterweights.

17. The bicycle rim assembly of claim 1, wherein the counterweight is removably attached to the receiver.

18. The bicycle rim assembly of claim 1, wherein the counterweight is permanently attached to the receiver.

19. The bicycle rim assembly of claim 1, wherein at least a portion of the rim is fiber reinforced plastic.

20. A counterweight assembly kit for a bicycle wheel having a rim, comprising:
   a plurality of alternative counterweights having different masses and external dimensions, each of the plurality of counterweights attachable to the rim of the bicycle wheel symmetrically opposite a valve stem of the rim to counterbalance the weight of the valve stem to balance the bicycle wheel; and
   one or more receivers configured to be attached to the bicycle rim symmetrically opposite the valve stem, each of the one or more receivers configured to receive one of the plurality of counterweights, wherein the plurality of alternative counterweights are configured to extend different lengths about the circumference of the rim.

21. The counterweight assembly kit of claim 20, wherein each of the plurality of counterweights includes one or both of a mounting element and a weight.

22. The counterweight assembly kit of claim 21, wherein the weight includes a radially outer surface that is shaped to be received on a radially inner surface of the rim.

\* \* \* \* \*